April 3, 1928.
J. H. WHITE
1,664,654
COMBINED BUMPER AND SAFETY APPLIANCE
Filed Aug. 11, 1927
2 Sheets-Sheet 1
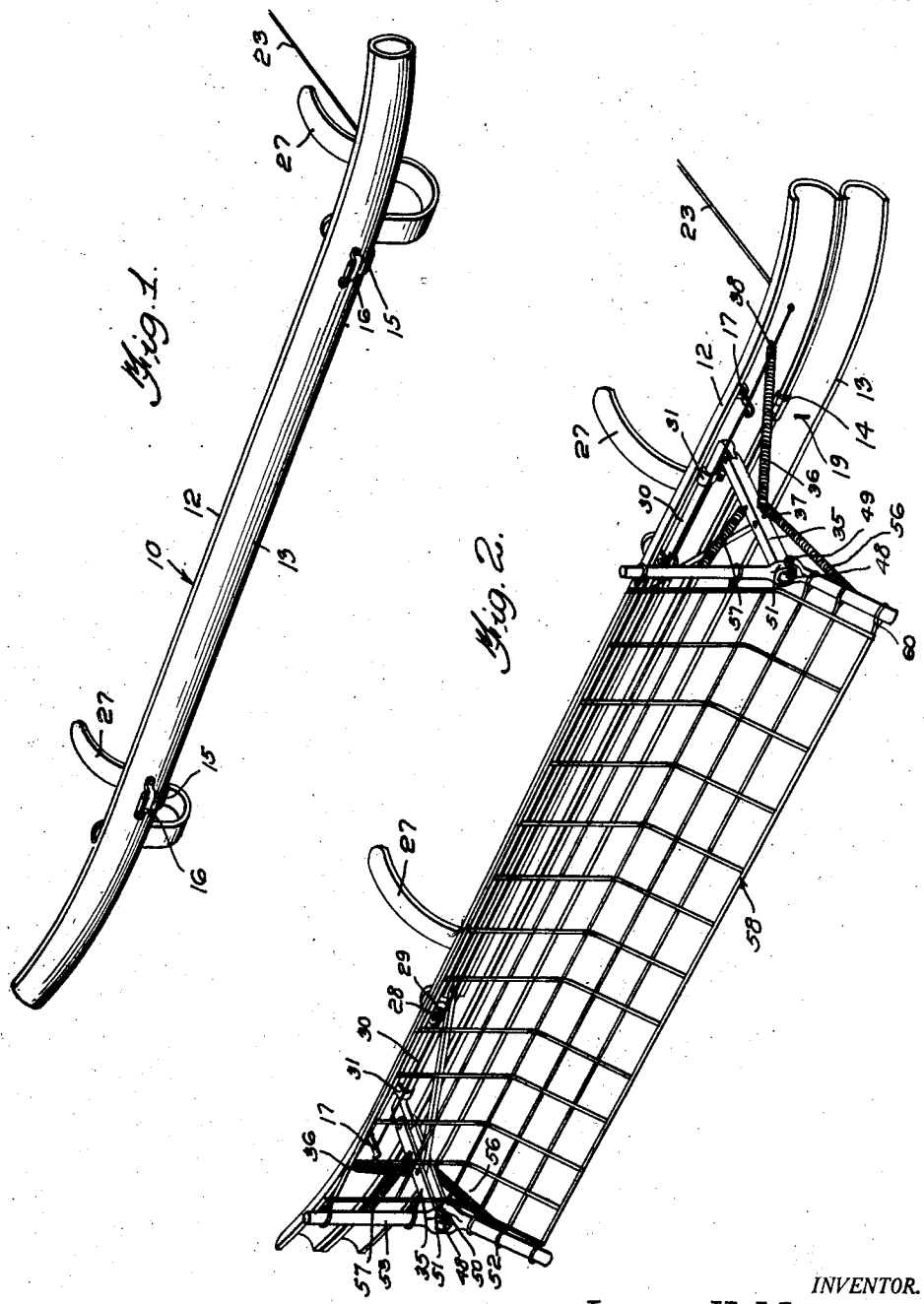
INVENTOR.
JOSEPH H. WHITE,
BY
ATTORNEY.

April 3, 1928.
J. H. WHITE
1,664,654
COMBINED BUMPER AND SAFETY APPLIANCE
Filed Aug. 11, 1927    2 Sheets-Sheet 2
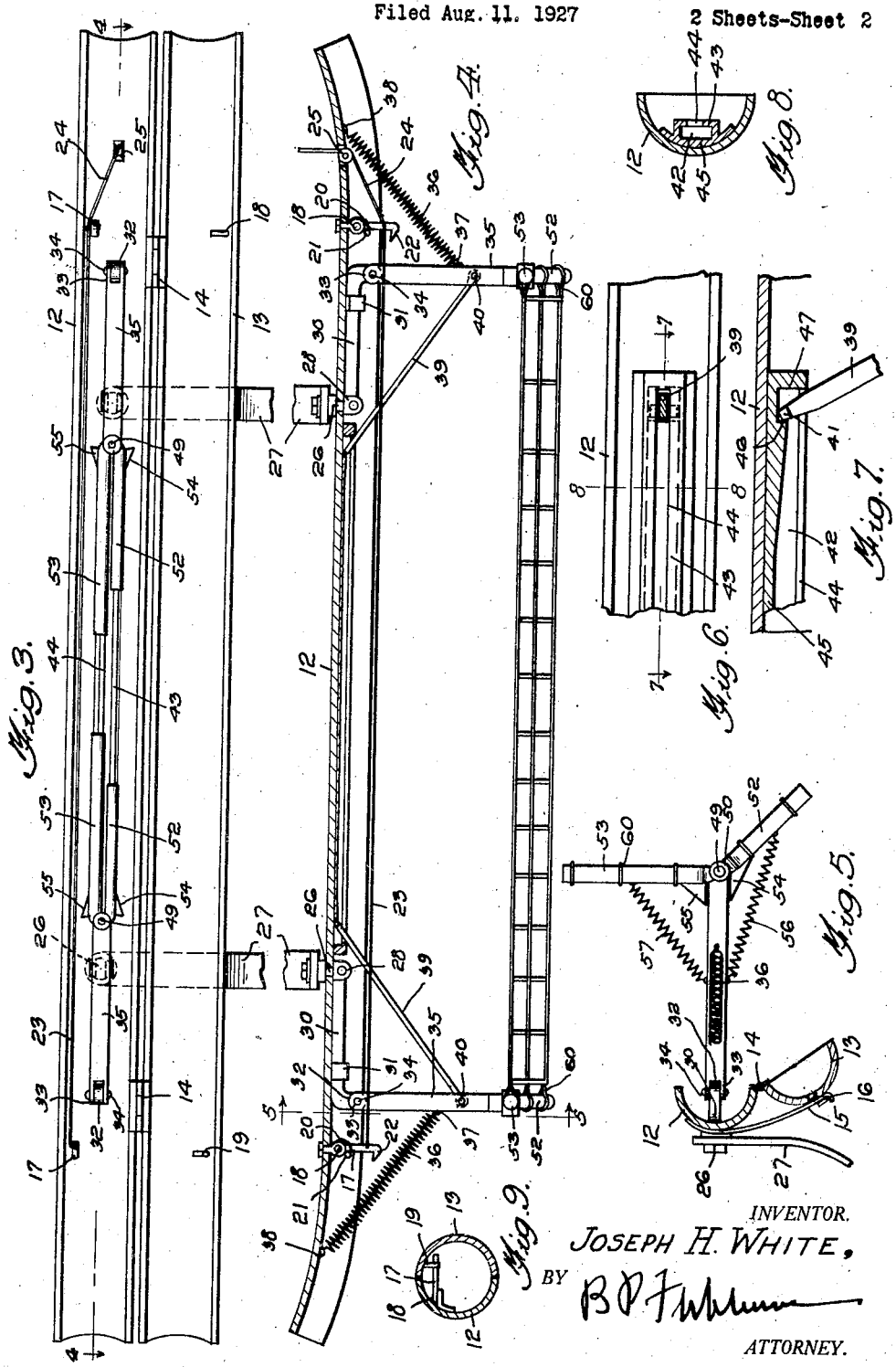
INVENTOR.
JOSEPH H. WHITE,
BY
ATTORNEY.

Patented Apr. 3, 1928.

1,664,654

UNITED STATES PATENT OFFICE.

JOSEPH H. WHITE, OF FLORENCE, SOUTH CAROLINA, ASSIGNOR OF ONE-HALF TO HAL H. HARBIN, OF FLORENCE, SOUTH CAROLINA.

COMBINED BUMPER AND SAFETY APPLIANCE.

Application filed August 11, 1927. Serial No. 212,337.

My invention is a combined bumper and safety appliance, for use upon automobiles or other vehicles.

In accordance with the preferred embodiment of my invention I provide a bumper, preferably in the form of a tube, which is mounted upon the front of the automobile in any well known or preferred manner. The tubular bumper is formed in longitudinal sections, one of which is adapted to be released and opened. Mounted within this tubular bumper is a self-opening safety appliance, or fender, which when in the operative position, is adapted to catch a pedestrian, and save him from injury, in the event that he should be struck by the traveling vehicle. The safety appliance is collapsible and is stored within the tubular bumper and is held in a condition ready for use. While it is preferred to mount the safety appliance within the tubular bumper, the invention is not necessarily restricted to this feature.

In the accompanying drawings forming a part of this specification and in which like numerals are employed to designate like parts throughout the same, Figure 1 is a perspective view of the apparatus embodying my invention, showing the bumper closed, Figure 2 is a similar view showing the bumper opened, and the safety appliance or fender opened, Figure 3 is a side elevation of the tubular bumper, showing the same open, with the safety appliance collapsed, Figure 4 is a longitudinal section taken on line 4—4 of Figure 3, Figure 5 is a transverse section taken on line 5—5 of Figure 3, Figure 6 is a fragmentary side elevation of the guide track, Figure 7 is a longitudinal section taken on line 7—7 of Figure 6, Figure 8 is a transverse section taken on line 8—8 of Figure 7, and;

Figure 9 is a transverse section through the tubular bumper, showing the latch device.

In the drawings, wherein for the purpose of illustration is shown a preferred embodiment of my invention, the numeral 10 designates a tubular bumper, as a whole, the outer ends of which are preferably bent rearwardly slightly. This tubular bumper embodies an inner relatively stationary section 12, and an outer movable section 13. The movable section is hinged at its bottom to the stationary section 12, as shown at 14, to swing forwardly to an open position to leave the open side of the bumper section 12 uncovered. The opening movement of the forward bumper section 13 is effected by means of suitably stiff curved leaf springs 15, arranged beneath the bumper sections 12 and 13, and having their rear ends suitably rigidly attached to the stationary bumper section 12. The forward ends of the leaf springs 14 are slidable within straps 16, secured to the front of the forward or movable bumper section 13. When the bumper section 13 is released, the springs 15 are so tensioned that they automatically swing such bumper section forwardly and downwardly, to an elevation beneath the stationary bumper section 12, and the springs 15 also serve to limit the downward movement of the forward bumper section 13.

Means are provided to lock the forward bumper section 13 to the rear bumper section 12, to prevent its opening movement, such means comprising a pair of latch elements 17, arranged within the tubular bumper, and pivoted at 18 to the top of the bumper section 12. These latch elements are adapted to engage over pins or lugs 19, rigidly attached to the upper portions of the forward bumper section 13. The latch elements 17 are forced toward the pins or lugs 19 by springs 20 and their movement in that direction may be limited by stops 21, carried by the rear bumper section 12. The forward ends of the latch elements 17 are preferably beveled, as shown at 22, so that they may be automatically shifted laterally by the pins or lugs 19, prior to engaging about the same.

The latch elements 17 are preferably connected by means of a flexible element or cable 23 and a flexible element or cable 24 is attached to one latch element 17 and preferably passes about a spool or roller 25 carried by the bumper section 12. The cable 24 may be led to any convenient point in the automobile, so that it may be conveniently pulled by the driver. I preferably lead this cable to a point near the steering wheel, at the dash.

The rear or stationary bumper section 12 is carried by bolts 26, which may be secured to U-shaped springs 27, in turn attached to the forward end of the chassis of the automobile. If desired, the spring 27 may be omitted and the bolts 26 might be connected directly with the chassis.

The heads of these bolts are arranged within the stationary bumper section 12 and are forked to provide pairs of knuckles 28, between which are arranged knuckles 29 of attaching elements or rods 30. These attaching elements or rods extend longitudinally within the stationary bumper section 12 toward their outer ends and are attached to the bumper section 12, adjacent to their outer ends by straps 31 or the like.

At their outer ends, the attaching rods or elements 30 are provided with forwardly projecting knuckles 32, receiving thereon knuckles 33 which are pivoted thereto at 34. These knuckles are carried by arms 35, with which they are preferably formed integral. When in the folded position, the arms 35 overlap the attaching elements or rods 30 and are substantially parallel thereto. The arms 35 are automatically swung forwardly, when released, by retractile coil springs 36, attached thereto at 37, while the outer ends of the springs are attached to the bumper section 12, at 38.

Means are provided to limit the swinging movement of each arm 35, including a link 39, pivoted thereto at 40. This link is provided at its inner end with a cross head 41, operating within under-cut grooves 42, formed in a strip 43, rigidly attached to the interior of the stationary bumper section 12, between the bolts 26, as shown. A longitudinal slot 44 leads to the under-cut groove, and the link 39 operates within this slot. The bottom wall 45 of the under-cut groove 42 is inclined forwardly toward its outer end, affording an abrupt shoulder 46, arranged inwardly of and spaced from the end 47 of the groove. It will thus be seen that when the arm 35 is swung forwardly to assume a position substantially perpendicular to the inner bumper section 12, that the cross head 41 will travel into the recess between the shoulder 46 and end wall 47, and will become automatically locked between these parts, until the link 39 is manually shifted laterally so that the cross head may clear the shoulder 46.

Each horizontally swinging main arm 35 is provided at its free end with a knuckle 48. This knuckle 48 is pivotally connected at 49, with knuckles 50 and 51, carried by vertically swinging branch arms 52 and 53, as shown. The lower branch arm 52 is provided near its pivot with a stop lug 54, arranged to engage with the main arm 35, and the upper branch arm 53 is equipped with a stop lug 55 arranged to engage with the main arm 35. The purpose of these stop lugs is to limit the opening movement of the branch arms. A retractile coil spring 56 is attached to the lower branch arm 52 and to the main arm 35, and a retractile coil spring 57 is attached to the upper branch arm 53 and to the main arm 35, as shown, and serve to automatically swing these branch arms to the open position, when released.

The body portion of the safety appliance or fender is indicated at 58, and may be formed of any flexible material such as net. Loops 60 are attached to the ends of the flexible body portion 58 and are secured to the branch arms 52 and 53, as shown.

In operation, the branch arms 52 and 53 are folded inwardly toward each other, until they assume substantially a straight angle with the main arm 35 and the main arm is folded inwardly over the attaching element or rod 30, the flexible body portion 58 being suitably folded between these parts. When thus collapsed, the safety appliance or fender is completely housed within the bumper sections 12 and 13, the bumper section 13 being now located in the closed position. To release the safety appliance or fender, the cable 24 is pulled rearwardly, shifting the latch elements 17 out of engagement with the pins or lugs 19, and the spring 15 will quickly swing the bumper section 13 to the forward and lower position, uncovering the forward side of the bumper section 12. The springs 36 now instantly swing the arms 35 forwardly, to substantially horizontal positions, perpendicular to the bumper section 12, in which position they are locked by the links 39 and associated elements. Substantially simultaneously with this action, springs 56 and 57 swing the branch arms 52 and 53 to the open positions, which in turn hold the flexible body portion 58 suitably taut. This safety appliance or fender, between the branch arms, possesses suitable flexibility and resiliency and upon striking a pedestrian, may serve to pick him up without undue injury. The lower branch arms 52 are preferably inclined at about 45°, while the upper branch arms 53 are preferably substantially vertical, the flexible body portion 58 conforming to this arrangement by virtue of its connections with the same.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. In a combined bumper and safety appliance, a tubular bumper element embodying a relatively stationary bumper section and a movable bumper section, means to lock the movable bumper section in a closed position, means to automatically shift the movable bumper section to an open position when released, and a self-opening safety appliance adapted when collapsed to be stored within the tubular bumper element and attached to the stationary bumper section.

2. A combined bumper and safety appliance, a tubular bumper element including a relatively stationary section and a movable section, main arms pivoted within the stationary bumper section to swing longitudinally thereof, means to effect the swinging movement of said arms, branch arms pivotally carried by each main arm, means to swing the branch arms to the open position, and a flexible body portion carried by the branch arms.

3. In a combined bumper and safety appliance, a tubular bumper section embodying a stationary section and a movable section, main arms pivoted within the stationary bumper section to swing longitudinally thereof, springs to automatically swing the main arms outwardly, means to automatically lock the main arms in the outer position when swung thereto, branch arms pivoted to each main arm, springs to automatically swing the branch arms to the open position, and a flexible body portion carried by the branch arms.

4. A combined bumper and safety appliance comprising a bumper element, supporting elements mounted upon the bumper element embodying members foldable longitudinally of the bumper element and parts foldable transversely of said members, and a flexible body portion carried by said parts.

5. A combined bumper and safety appliance, comprising a bumper element, supporting devices pivotally mounted upon the bumper element to swing longitudinally thereof, means to swing the devices longitudinally of the bumper element to an open position, means to lock said devices in the open position, and a flexible body portion carried by said devices.

6. A combined bumper and safety appliance, comprising a support, main arms pivotally mounted upon the support to swing generally horizontally to an open position, means to swing the main arms to the open position and hold them in such a position, auxiliary arms pivotally mounted upon the main arms to swing generally vertically with relation thereto for assuming open positions, means to swing the auxiliary arms to the open position, and a flexible body portion carried by the auxiliary arms.

7. In a combined bumper and safety appliance, a tubular bumper element embodying a relatively stationary bumper section and a movable bumper section, means for holding the movable bumper section in a closed position, and a self-opening safety appliance adapted when collapsed to have all parts thereof stored within the tubular bumper element.

8. In a combined bumper and safety appliance, a hollow bumper element, and a self-opening safety appliance, including supporting means, adapted when collapsed to have all parts thereof stored within the hollow bumper element.

9. In a combined bumper and safety appliance, a hollow bumper element having its forward side open, means to cover the forward open side of the bumper element, and a self-opening safety appliance including supporting means, attached to the hollow bumper element and adapted when collapsed to have all parts thereof stored within the hollow bumper element.

In testimony whereof I affix my signature.

JOSEPH H. WHITE.